(12) United States Patent
Hoffer et al.

(10) Patent No.: US 9,005,741 B1
(45) Date of Patent: Apr. 14, 2015

(54) MULTI-SPECTRAL CLOAK SYSTEM

(71) Applicants: Erik H. Hoffer, Punta Gorda, FL (US);
Clint Meyers, Redmond, WA (US)

(72) Inventors: Erik H. Hoffer, Punta Gorda, FL (US);
Clint Meyers, Redmond, WA (US)

(*) Notice: Subject to any disclaimer, the term of this patent is extended or adjusted under 35 U.S.C. 154(b) by 0 days.

(21) Appl. No.: 14/530,705

(22) Filed: Nov. 1, 2014

Related U.S. Application Data

(63) Continuation-in-part of application No. 14/318,453, filed on Jun. 27, 2014, now abandoned, which is a continuation-in-part of application No. 13/542,986, filed on Jul. 6, 2012, now abandoned.

(60) Provisional application No. 61/590,371, filed on Jan. 25, 2012.

(51) Int. Cl.
| | |
|---|---|
| *B32B 3/00* | (2006.01) |
| *F41H 3/02* | (2006.01) |
| *G02B 5/20* | (2006.01) |
| *G02B 5/22* | (2006.01) |
| *G02F 1/1335* | (2006.01) |
| *G02F 1/19* | (2006.01) |

(52) U.S. Cl.
CPC *F41H 3/02* (2013.01); *G02B 5/206* (2013.01); *G02B 5/223* (2013.01); *G02F 1/133504* (2013.01); *G02F 1/19* (2013.01); *Y10S 428/913* (2013.01); *Y10S 428/919* (2013.01)

(58) Field of Classification Search
CPC .......... B32B 27/20; F41H 3/02; G02B 5/206; G02B 5/223; G02F 1/133504; G02F 1/19; Y10S 428/913; Y10S 428/919
USPC ........ 428/196, 206–209, 919; 442/59, 64, 74, 442/131–133, 220, 229, 230, 231; 427/258, 427/261, 262, 265, 280, 285, 288, 71, 180
See application file for complete search history.

(56) References Cited

U.S. PATENT DOCUMENTS

| | | | | |
|---|---|---|---|---|
| 4,495,239 A | * | 1/1985 | Pusch et al. | 428/192 |
| 6,726,964 B1 | * | 4/2004 | Thompson et al. | 427/600 |

* cited by examiner

*Primary Examiner* — Elizabeth Cole

(57) ABSTRACT

Fabric has a printed pattern with a base color and at least one design color. The design color has a plurality of irregular, non-repeating spots. The printed pattern is adapted to abate identification of the fabric by a light responsive device. The fabric also includes metal extending throughout. The metal is adapted to abate identification of the fabric by an infrared, heat responsive device.

1 Claim, 3 Drawing Sheets

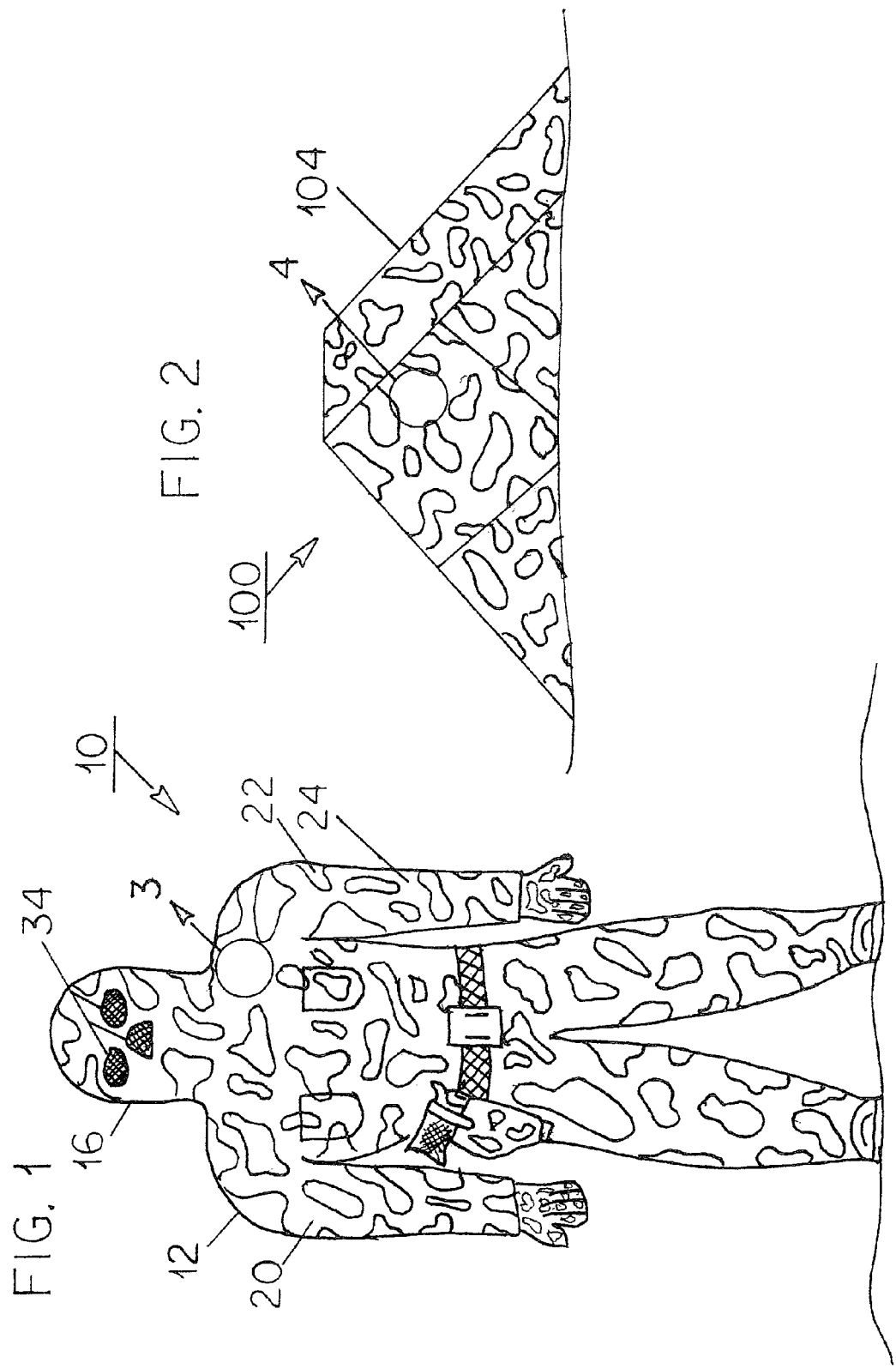

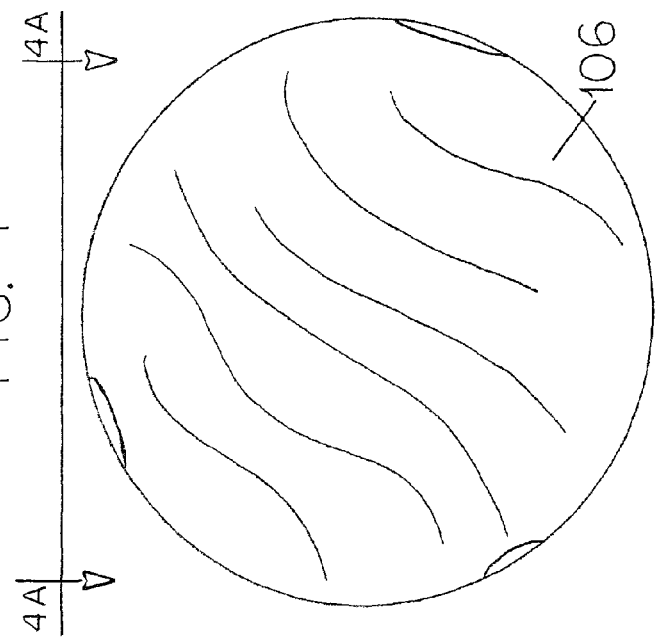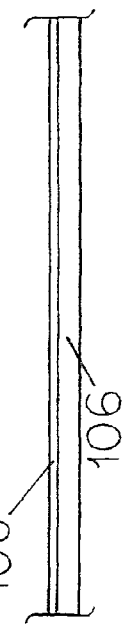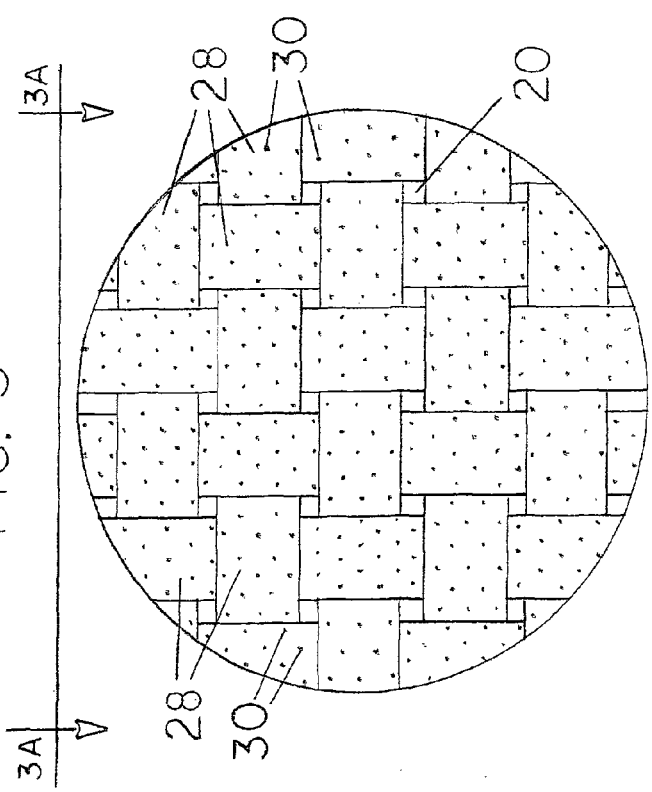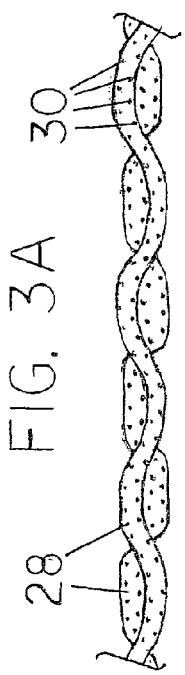

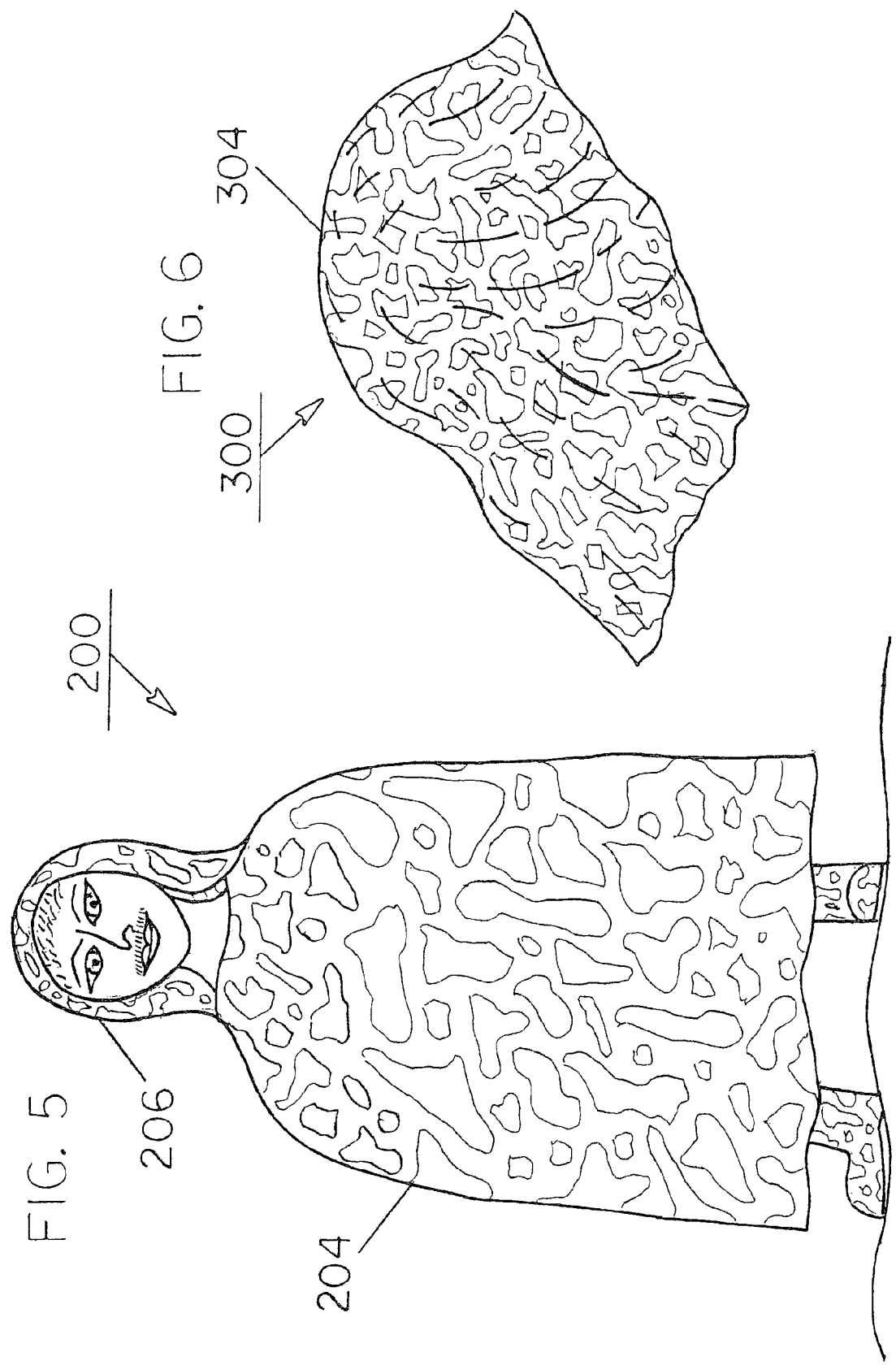

MULTI-SPECTRAL CLOAK SYSTEM

RELATED APPLICATIONS

The present application is a continuation in part of pending application Ser. No. 14/318,453, filed Jun. 27, 2014 which is a continuation-in-part of application Ser. No. 13/542,986, filed Jul. 6, 2012 which is based upon Provisional Patent Application No. 61/590,371 filed Jan. 25, 2012, the subject matter of which applications is incorporated herein by reference.

BACKGROUND OF THE INVENTION

Field of the Invention

The present invention relates to a multi-spectral cloak system and more particularly pertains to simultaneously abating detection by a light responsive device and by an infrared, heat responsive device in order for the garment and/or cover to remain invisible to light and heat responsive devices, the abating of detection and the remaining invisible being achieved in a safe, reliable, convenient, and economical manner.

SUMMARY OF THE INVENTION

In view of the disadvantages inherent in the known types of cloak systems of known designs and configurations now present in the prior art, the present invention provides an improved multi-spectral cloak system. As such, the general purpose of the present invention, which will be described subsequently in greater detail, is to provide a new and improved multi-spectral cloak system and method which has all the advantages of the prior art and none of the disadvantages.

To attain this, the present invention essentially comprises a multi-spectral cloak system. Fabric has a printed pattern with a base color and at least one design color. The design color has a plurality of irregular, non-repeating spots. The printed pattern is adapted to abate identification of the fabric by a light responsive device. The fabric also includes metal extending throughout. The metal is adapted to abate identification of the fabric by an infrared, heat responsive device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is, therefore, an object of the present invention to provide a new and improved multi-spectral cloak system which has all of the advantages of the prior art garment and cover systems of known designs and configurations and none of the disadvantages.

It is another object of the present invention to provide a new and improved multi-spectral cloak system which may be easily and efficiently manufactured and marketed.

It is a further object of the present invention to provide a new and improved multi-spectral cloak system which is of durable and reliable constructions.

An even further object of the present invention is to provide a new and improved multi-spectral cloak system which is susceptible of a low cost of manufacture with regard to both materials and labor, and which accordingly is then susceptible of low prices of sale to the consuming public, thereby making such multi-spectral cloak system economically available to the buying public.

Even still another object of the present invention is to provide a multi-spectral cloak system for simultaneously abating detection by a light responsive device and by an infrared, heat responsive device in order for the garment and/or cover and/or wearer to remain invisible to light and heat responsive devices, the abating of detection and the remaining invisible being achieved in a safe, reliable, convenient, and economical manner.

Lastly, it is an object of the present invention to provide a new and improved multi-spectral cloak system. Fabric has a printed pattern with a base color and at least one design color. The design color has a plurality of irregular, non-repeating spots. The printed pattern is adapted to abate identification of the fabric by a light responsive device. The fabric also includes metal extending throughout. The metal is adapted to abate identification of the fabric by an infrared, heat responsive device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a multi-spectral cloak system constructed in accordance with the principles of the present invention, a suit.

FIG. 2 is a perspective illustration of an alternate embodiment of the invention, a tent.

FIG. 3 is an enlarged showing of a portion of the system taken at Circle 3 of FIG. 1.

FIG. 4 is an enlarged showing of a portion of the system taken at Circle 4 of FIG. 2.

FIG. 3A is a side elevational view taken along line 3A-3A of FIG. 3.

FIG. 4A is a side elevational view taken along line 4A-4A of FIG. 4.

FIGS. 5 and 6 are additional alternate embodiments of the invention, a poncho and a tarp.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved multi-spectral cloak system embodying the principles and concepts of the present invention and generally designated by the reference numeral 10 will be described.

The present invention, the multi-spectral cloak system 10 is comprised of fabric configured so as to attain the desired objective.

First provided is a garment 12. The garment includes a leg covering portion. The garment includes a head covering portion. The head covering portion has eye and nose sections 16. The garment includes a torso covering portion. The torso covering portion has arm sections.

The garment has an exterior surface 20. The exterior surface has a printed pattern. The exterior surface has a base color 22. The base color is of a first wavelength. The base color covers a substantial portion of the exterior surface. The printed pattern has at least one design color 24. The design color is of at least one second wavelength different from the first color. The design color covers a substantial portion of the exterior surface. The design color has a plurality of irregular, non-repeating spots. The printed pattern is adapted to abate identification of the garment and a person wearing the garment by a light responsive device.

The garment is constructed of a fabric. The fabric is formed of a plurality of woven non-metallic threads 28 with metallic components 30. The metallic components extend throughout the fabric. The metallic components are chosen from the class of metallic component. The class of metallic components includes silver, copper, graphite, nickle and gold. The metallic components are adapted to abate identification of the garment and a person wearing the garment by an infrared, heat responsive device. Note FIGS. 3 and 3A.

Provided last are mesh coverings 34. The mesh coverings are provided over the eye and nose sections. The mesh coverings are fabricated of non-metallic threads with metallic components extending throughout. The metallic components are adapted to abate identification of the garment and a person wearing the garment by an infrared, heat responsive device. Note FIG. 1.

In the first alternate embodiment 100 of the present invention, the fabric is constructed into a tent 104. Note FIG. 2.

The fabric includes a sheet 106 of a non-metallic material. The fabric further includes a sheet 108 of aluminized mylar.

In the next alternate embodiment 200 of the present invention, the fabric is constructed into a poncho. The poncho has a body portion 204. The poncho also has a hood 206. Note FIG. 5.

In the last alternate embodiment 300 of the present invention, the fabric is constructed into a tarp 304. Note FIG. 6.

The multi-spectral cloak system of the present invention is a product that has multiple camouflage-style uses and can be adapted to different environments, technological advances and changes in detection methods.

It is comprised of a material coated or otherwise impregnated with a conductive media ranging from silver, copper, graphite, nickel or gold in varying amounts based on the intended purpose, in such a manner as to make the final coated material able to dissipate thermal energy when viewed by a thermal camera or scope for that purpose. The net effect of the conductive coating is to help render the material invisible, distorted, undetectable, or difficult to detect through thermal imaging cameras or devices used to detect thermal signatures in military, civilian, law enforcement or a wide variety of applications. The tactical aspect of this first claim of the invention is that the resulting material which is in a raw state is compatible with the manufacturing of clothing, shrouds, tarpaulins or enclosures and/or other flexible coverings for weapons, warfighters, or equipment of any kind. The conductive element is imbedded into the media, or it can be applied on to it by coating, metalizing, ion deposition, screen printing or any conversion methods useful in applying these conductive pigments to the material. The application can be in coating weights and densities and can be applied by different techniques to gain the desired visual deterrent and camouflage effect. The metal element can be disbursed in the chosen form of liquid or rod, be that from liquid inks or coatings, metal rods for vapor deposition, vaporized, ink of any description with any vehicles such as water or solvent, or coated by any method suitable to carry the metal to the chosen material at any deposition or density desired by the end use. The conductive layer can also be useful for attenuation of any electronic signature of the product to be covered and also to dissipate the thermal signature of the item covered by using the area of the material as a heat sink in such a way as to prevent penetration, detection, or escape of electromagnetic interference, EMI, or radio frequency interference, RFI.

The second characteristic of the technology, which is combined with the conductive layer, is a partial or complete coating of a near infra-red absorber/s, henceforth called NIR coatings or near infrared, NIR, layers, which will hinder detection by normal night vision equipment. By absorbing the near infra-red signature, at different levels and densities, the material disrupts the typical detection ability of these devices and thereby distorts the ability of an adversary from detecting the person or asset being viewed. This quality diminishes the near infrared signature, whether near-infrared illumination is utilized or not. This creates a surface that will be difficult to be detected by normal night vision equipment with or without near-infrared illuminators, such as, but not limited to, lasers or light emitting diode systems.

The near infrared, NIR, coatings are layered in graduated amounts to create optical interference with near infra-red detection equipment. The combination of the technologies creates optical interference with thermal and near infrared detection equipment causing the reflections and absorption to be gradated in such a manner that the covered item becomes fully or partially obscured, hindering detection by conventional night vision, SWIR, Short Wave Infrared, and/or thermal viewing equipment and/or IR-sensitive CCD/CCTV cameras. These characteristics can be applied by any means, and may be both visible as normal camouflage colors and/or invisible as imbedded coatings in the medium used to print the visual colors and/or invisible patterns. These near infrared, NIR, layers can be applied by any means including, but not limited to, coating, screen printing or inkjet printing or batch dipping. They could be both visible as normal camouflage colors, as to create a camouflage effect to thwart visual detection in day light or low light, and/or invisible as imbedded coatings alone or in the inks used to print the visual color.

The color of these items can be any color suitable for the application and can be conformed to resemble the environment where they will be used. This includes sand and dessert, snow or high white conditions, or green for most general purpose uses. The visual color could be applied before the conductive coatings and infrared coatings are applied or after, based on the item and how it is made and its purpose. Applications include shrouds, clothing, tarps, covers, ponchos, clothing, tents, pouches, sleeves for weapons and equipment, parachutes or covers, and/or any other covering used for such purposes. These may be part of the actual item or carried by the user as a separate covering to be deployed as needed.

The layers of near infra-red absorbing materials are initially in a liquid form. They can be printed by most any method applicable to the density of the ink for that particular printing method. They can be sprayed, roll coated, thermal transferred, sublimation printed, or applied as an additive layer or layers in any fashion, to the conductive surface of the cloth, such that with each layer on top of the other, at different points of contact or coverage, there is generated an absorbent signature such that when the density is altered by the overlap of these layers, each received signal is absorbed at a different rate thereby disguising the item under the cover to appear to be a different image or background space than it actually is. The layers created by the application of this coating are alterable by virtue of the design the user wishes to create.

This design is made by matching the gradients of reflected light of the optical or IR scanners, to what the desired image or effect should be, such that the image created appears to be similar to the ground or surroundings in a non-visual camouflage pattern, since the liquid can be colored or clear, as seen by the viewing scope and viewing method. The layers become built up by overlap and can be changed insofar as pigment density is concerned, to render different effects. These effects can be altered at will by the manufacturer. The layers are applied such that, for example layer 1 of 5 layers can be a pigment density of the coating at 70 percent, pigment to solvent ratio of the ink used. Then the second layer is applied over the 70 percent layer at 45 percent pigment to solvent density such that each subsequent layer can be changed to create the desired effect. The end product can be altered where some of the cloth becomes marked at 45 percent where the over pap is marked at 115 percent, 75 percent plus 45 percent, and so on throughout the multi layer process. The greater the density of lay down of the coating and the actual coating itself can render the variable darker or lighter in appearances as desired.

The appearance of the coating can be clear and thereby invisible to the naked eye or colored to also render a visual pattern, formally known as camouflage. The variables, therefore, are the density printed, the density of the coatings used and the configuration of the overlap to generate a discontinuous pattern of coating to create the disguise or non optical camouflage effect.

The coating can also be applied in a half tone pattern whereby there are areas in the coating that in and of themselves have a different density in the same manner that offset or screen printing would render a visual image such as a skin tone or tonal image to the eye. This halftone pattern can be created such that the lay down of the coatings has a variable absorbititive effect at the same time as having a variable density effect where the layers are overlaid.

Other imbedded or printed coatings may be applied to the media based on layering to achieve different visual or invisible effects. The main purpose of the invention is to disguise the shrouded asset to detection methods.

The value of the technology is effective in both daylight and at night since the visual camouflage effect can be altered to meet environmental or physical needs.

The utility of the invention is to provide a masking effect to assets in the field that could be detected by the use of thermal imaging devices during the day or night and/or to mask them when attempts are being made to detect the assets with night vision and/or SWIR, Short Wave Infrared, equipment and/or IR sensitive CCD/CCTV cameras.

The technology can be made of any rigid or flexible plastic, any cloth or material with sufficient porosity to enable it to be coated or embedded with the component coatings and inks. It can be a formed unit, sewn clothing or any combination of media that suits the end use.

Insofar as we are aware, there is no such item in the field or in use anywhere making this invention a unique and highly innovative product and technology.

The primary, preferred embodiment of the invention is piece of fabric adapted to provide electro-optical camouflage to an object beneath the piece of fabric. The piece of fabric is formed of a base and a plurality of printed layers. Such piece of fabric is highly flexible before and after printing such that it may be carried, coiled, rolled, and initially folded so as not to lose any of its properties in use.

The base is a material of woven threads with a coating. The woven threads are initially formed of electrical insulating threads with interstices between the threads. The base has an exterior surface and an interior surface. The coating is metal particles bonded to and covering the exterior and interior surfaces including the interstices. The metal particles are penetrated into the exterior and interior surfaces including the interstices. The metal particles have a maximum dimension of approximately 0.5 microns. The base has a resistivity of less than 125 milliohms per square. The base is adapted to absorb emissions from the object and to dissipate heat signatures of the object.

The plurality of printed layers includes a primary printed layer applied to a primary portion of the coating. The plurality of printed layers include a secondary printed layer applied to a secondary portion of the coating. The secondary portion covers a portion of the primary printed layer and a portion of the coating remote from the primary portion of the coating. The plurality of printed layers include a tertiary printed layer applied to a tertiary portion of the coating. The tertiary portion covers a portion of the primary printed layer and a portion of the secondary printed layer and a portion of the coating remote from the primary portion of the coating and remote from the secondary portion of the coating. The primary printed layer and the secondary printed layer and the tertiary printed layer are formed of energy absorbing pigments in a binder, the binder being chosen from the class consisting of urethane, methyl ethyl ketone, and acetane.

The binder evaporates from the base during fabrication leaving layers of energy absorbing pigments of substantially similar thickness throughout the piece of fabric. In this manner, portions with primary and secondary and tertiary printed layers will have a greater density of energy absorbing pigment than portions with only primary and secondary layers. In addition, portions with primary and secondary layers will have a greater density of energy absorbing pigments than portions with only primary layers. The plurality of printed layers are adapted to obscure detection from imaging devices detecting wavelengths between 400 nanometers to 1.8 microns, and from 3 microns to 14 microns, in a pattern determined by the configurations and densities of the primary and secondary and tertiary layers and their densities to thereby create a non-optically visible image distortion.

Each of the printed layers includes a plurality of laterally spaced markings, the density of which markings can be altered by the density of added pigment to the printed layers. The layers are created by printing through variations of screen printing, ink jet printing, spraying, flexography, lithography and other forms of additive printing that may be appropriate for the fabricator in such a manner as to apply the pigments in a pattern as designed for the theater of use and applied in a format so as to create the appearance of the suggested background of use. For example consider trees, sand, and rocks, the density of each layer of pigments on the fabric can be varied so as to create visual and non-visual obscuration of the subject protected by the piece of fabric to detection by various means of visual night time interrogation methodology such as SWIR, thermal Imaging and Infra-red cameras to mention a few such devices.

The layers have a thickness of from 4 microns to as much as 100 microns.

The interior surface is devoid of printed absorbers while still having metallic particles present.

The base is imperforate.

The threads are chosen from the class consisting of rip stop and polyester/nylon blend.

The metal particles are is chosen from the class consisting of silver, copper, graphite, gold, carbon, and nickel.

The piece of fabric may further include colored pigments over the printed layers to create a conventional optically visible image distortion. The visual obscuring patterns are adapted to be varied based upon the needs of the user and the theater of operation. The visual obscuring patterns are adapted to be made to look like trees, bricks, rocks and sand and they can be of any appropriate color for their use such as white in snow, green in a forest or rust as in a sandy environment. The added pigments are adapted to be printed by any appropriate method such as screen printing, flexography, spray, spray masking, thermal transfer, sublimation, ink jet, or lithography as may be appropriate for the clarity and ink density required by a user.

The piece of fabric further includes colored pigments within the energy absorbing pigments and the binder of at last one of the printed layers to create a conventional optically visible image distortion.

The energy absorbing pigments are chosen from the class consisting of rare earth pigments, infrared absorbing pigments, and other blends of pigments that are used for their inherent unique properties in absorbing visible, Near-IR, SWIR, MWIR, and LWIR signals.

The energy absorbing pigments are raw naphthalocyanine pigments initially in the form of dry sub-micron particles and flakes. The raw naphthalocyanine pigments are processed via milling to form a liquid dispersion of fine pigment particles having particle sizes in the 10-200 nm range. The milling process is enhanced by the use of dispersants. The naphthalocyanine pigments are anionic surfactants of asymmetric structure, characterized by a long, flexible alkyl chain, hydrophobic portion, and an alkyl chain connected to moderately hydrophilic poly(ethylene oxide, PEO, chain, and one or more hydrophilic anionic groups, head groups, directly attached to the flexible part of the structure, the alkyl chain, and the alkyl plus PEO chain.

The object is chosen from the class of objects including a person, a vehicle, a weapon, or any coverable equipment.

Example 1

The piece of cloth in Example 1 is a pliable rip stop white colors nylon having a thickness of approximately 0.010 which has been batch coated over 100% with silver ink such that the silver ink adheres to 100% of the fibers and that it has the same physical properties both top and bottom. The conductive nature of the nylon material will be approximately 30 milliohms per square but can be as low as 10 milliohms per square and as high at 100 milliohms per square to be effective. Once that physical material is finished and cured it is then printed by either screen printing or any chosen method as outlined in the patent claim. The absorbing coatings are then mixed to different densities and made ready for printing. The printing can be done in a manner that covers all or most of the fabric with coating in various passes of various printed shapes which may over lap and yet cover all or most of the material. Once printed this first iteration can have areas on the face of the cloth that have 500% coverage while others have less than 50% coverage based on the optical pattern first designed for the application. This first iteration can have various lines, circles and stripes overlapping and independent on the face of the cloth. Only one side of the cloth is used to print. The multiple layering that represent color A through (N) can have as few as three layers of color and up to hundreds of layers based on the design. The percentage of pigmentation in each color can also be altered so that in color A the amount of pigment is 70% of the ink where in color B the amount of pigment is only 30%. If an example were made of inks with color, the color A may be red while color B may be blue and so on. Each ink is different and the ration of solvent to pigment varies as well with each ink. When these layers are combined or even overlapped they create a unique recipe where the ratio of ink/density/coverage changes the visualization effect under these electronic surveillance methods thereby creating a distortion pattern suitable for the theater of use. The actual absorbing pigments in this example can be light grey or green and be hardly seen visually. The use of colors is optional.

Example 2

The cloth in EXAMPLE 2 can be somewhat different but preferably any synthetic not cotton that can absorb and remain stable under printing and washing. That cloth can be a polyester/nylon blend and can be rip stop or not. In this example there are a number of coating layers of sprayed inks that cover up to 100% of the cloth and have areas where the lay down density fluctuates from 50% to 500%, but done by a spray methods rather than by a discrete printing methods like screen printing, lithography or ink jet. Once the cloth is impregnated with silver paint the cloth is then sized and dried and then has a face surface coating binder that is applied in batch to enhance the ability of the cloth to receive inks.

The first coating on Example 2 will have multiple printed densities of the wave length absorbing compound suspended in a spray paint formula that has a density and ratio of application for each batch of coating made up and sprayed independently. Once each is made it is then sprayed through a mask where certain layers receive 100% of the coating and other areas receive none. Each sprayed down pattern area has a variable percentage of the coating to create a net result in mimicking the visual rendition of the item/backdrop we are trying to replicate such as sand, rocks, trees, bushes etc. when viewed under electronic type surveillance equipment such as SWIR, near infra-red, thermal imaging and night vision cameras. Example 2 can look far different from Example 1. Also in example two the color of the absorbing pigments can be made to look green, yellow, black or red such that each is easily seen as a unique sprayed lay-down to one side of the cloth. The use of colors is optional.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A piece of fabric providing electro-optical camouflage to an object beneath the piece of fabric, the piece of fabric being formed of a base and a plurality of printed layers, such piece of fabric being highly flexible before and after printing such that it may be carried, coiled, rolled and folded so as not to lose any of its electro-optical camouflage properties in use;

the base being a material of woven threads with a coating, the woven threads being initially formed of electrical insulating threads with interstices between the threads, the base having an exterior surface and an interior surface, the coating being metal particles bonded to and covering the exterior and interior surfaces including the interstices, the metal particles penetrating into the exterior and interior surfaces including the interstices, the metal particles having a maximum dimension of approximately 0.5 microns, the base having a resistivity of less than 125 milliohms per square, the base absorbs emissions from the object and dissipates heat signatures of the object;

the plurality of printed layers including a primary printed layer applied to a primary portion of the coating, the plurality of printed layers including a second printed layer applied to a secondary portion of the coating, the secondary portion covering a portion of the primary printed layer and a portion of the coating remote from the primary portion of the coating, the plurality of printed layers including a tertiary printed layer applied to a tertiary portion of the coating, the tertiary portion covering a portion of the primary printed layer and a portion of the secondary printed layer and portion of the coating remote from the primary portion of the coating and remote from the secondary portion of the coating, the primary printed layer and the secondary printed layer and the tertiary printed layer being formed of energy absorbing pigments in a binder, the binder comprising a component chosen from the group consisting of urethane, methyl ethyl ketone and acetane, the component chosen from the group consisting of urethane, methyl ethyl ketone and acetane evaporating from the base during fabrication leaving layers of energy absorbing pigments of substantially similar thickness throughout the piece of fabric, whereby portions with primary and secondary and tertiary printed layers which have a greater density of energy absorbing pigment than portions with only primary and secondary layers and whereby portion with primary and secondary layers will have a greater density of energy absorbing pigments than portions with only primary layer, the plurality of printed layers obscure detection from imaging devices detecting wavelengths between 400 nanometers to 1.8 microns, and from 3 microns to 14 microns in a pattern determined by the configurations and densities of the primary and secondary and tertiary layers to thereby create a non-optically visible image distortion;

and wherein the energy absorbing pigments are raw naphthalocyanine pigments initially in the form of dry sub-micron particles and flakes, the raw naphthalocyanine pigments being processed via milling to form a liquid dispersion of fine pigment particles having particle sizes in the 10-200 nm range, the milling process being enhanced by the use of dispersants.

* * * * *